(12) United States Patent
Guiselin et al.

(10) Patent No.: US 7,473,722 B2
(45) Date of Patent: Jan. 6, 2009

(54) POLYMER-FIBER COMPOSITE BUILDING MATERIAL WITH BULK AND AESTHETICALLY FUNCTIONAL FILLERS

(75) Inventors: Olivier Guiselin, Northboro, MA (US); Husnu Kalkanoglu, Swarthmore, PA (US); Christelle Pousse Le Goff, Paris (FR); Randall J. Elinski, Jackson, MI (US); Gregory P. Quist, Muskegon, MI (US); Paul Ruede, Parkville, MO (US); Richard A. Hills, Jackson, MI (US)

(73) Assignee: Certain Teed Corp., Valley Forge, PA (US)

( * ) Notice: Subject to any disclaimer, the term of this patent is extended or adjusted under 35 U.S.C. 154(b) by 337 days.

(21) Appl. No.: 10/983,389

(22) Filed: Nov. 8, 2004

(65) Prior Publication Data

US 2006/0099405 A1    May 11, 2006

(51) Int. Cl.
 *C08K 3/34* (2006.01)
(52) U.S. Cl. .................. 523/218; 524/435; 524/437; 524/443; 524/445; 524/451
(58) Field of Classification Search ................ 524/442, 524/443, 425, 494, 445, 451, 435, 437; 523/218
 See application file for complete search history.

(56) References Cited

U.S. PATENT DOCUMENTS

| | | | |
|---|---|---|---|
| 3,983,295 A | | 9/1976 | Murer et al. |
| 3,983,668 A | | 10/1976 | Hassman |
| 4,265,981 A | | 5/1981 | Campbell |
| 4,571,118 A | | 2/1986 | Schmanski |
| 4,812,343 A | | 3/1989 | Kiekhaefer et al. |
| 4,820,749 A | | 4/1989 | Beshay |
| 4,860,996 A | | 8/1989 | Robbins, III |
| 5,008,310 A | | 4/1991 | Beshay |
| 5,030,662 A | * | 7/1991 | Banerjie ................. 521/43.5 |
| 5,189,822 A | | 3/1993 | Schmanski et al. |
| 5,219,656 A | | 6/1993 | Klett et al. |
| 5,318,737 A | | 6/1994 | Trabert et al. |
| 5,369,147 A | | 11/1994 | Mushovic |
| 5,486,416 A | | 1/1996 | Johnson et al. |
| 5,508,315 A | | 4/1996 | Mushovic |
| 5,510,398 A | * | 4/1996 | Clark et al. ................. 523/171 |
| 5,529,431 A | | 6/1996 | Walsh |
| 5,547,325 A | | 8/1996 | Tucker et al. |
| 5,580,626 A | | 12/1996 | Quigley et al. |
| 5,604,266 A | | 2/1997 | Mushovic |
| 5,792,529 A | | 8/1998 | May |
| 5,839,247 A | | 11/1998 | Beck |
| 5,847,016 A | | 12/1998 | Cope |
| 5,916,932 A | | 6/1999 | Nosker et al. |
| 5,967,498 A | | 10/1999 | Junell |
| 5,997,784 A | | 12/1999 | Karnoski |
| 6,021,611 A | | 2/2000 | Wells et al. |
| 6,042,305 A | | 3/2000 | Novich et al. |
| 6,122,877 A | | 9/2000 | Hendrickson et al. |
| 6,125,905 A | | 10/2000 | Woodside et al. |
| 6,156,682 A | | 12/2000 | Fletemier et al. |
| 6,197,412 B1 | | 3/2001 | Jambois |
| 6,344,268 B1 | | 2/2002 | Stucky et al. |
| 6,357,197 B1 | | 3/2002 | Serino et al. |
| 6,427,395 B1 | | 8/2002 | Elasser et al. |
| 6,502,360 B2 | | 1/2003 | Carr et al. |
| 6,702,967 B2 | * | 3/2004 | Overholt et al. ................. 264/77 |
| 6,758,996 B2 | | 7/2004 | Monovoukas et al. |
| 6,958,185 B1 | | 10/2005 | Zehner |
| 7,074,918 B2 | | 7/2006 | Medoff et al. |
| 2003/0004232 A1 | | 1/2003 | Ruede |
| 2003/0021915 A1 | | 1/2003 | Rohatgi et al. |
| 2003/0082338 A1 | | 5/2003 | Baker |
| 2003/0096096 A1 | | 5/2003 | Jo et al. |
| 2003/0198763 A1 | | 10/2003 | Fensel et al. |
| 2003/0218266 A1 | | 11/2003 | Hills |
| 2004/0048055 A1 | | 3/2004 | Branca |
| 2005/0266210 A1 | | 12/2005 | Dolinar et al. |
| 2005/0271872 A1 | | 12/2005 | Dolinar |
| 2005/0271889 A1 | | 12/2005 | Dolinar |
| 2006/0068215 A2 | | 3/2006 | Dolinar |

OTHER PUBLICATIONS

Prestige Wake up to the newest thing in fencing. Bufftech. trade literature, 5 pages.
Prestige. Set yourself apart. Bufftech. trade literature, 6 pages.
Twintex Applications. Vetrotex. trade literature, 1 page.
Glossary of Terms, Introduction to Composites, pp. 19 and 20.
Harvey, Martin T., "Thermoplastic Matrix Processing", pp. 544-553.
Martin, Jeffrey D., "Pultrusion", pp. 533-543.
Tecton Products: Innovative Composite Pultrusion Solutions, trade literature, 2 pages.
E-Z Rail Products, trade literature, 2 pages.
Geotek: Your Source For Quality Animal Containment. trade literature 3 pages.
Google Web Directory, "Composite Plastic", May 12, 2003, 4 pages.
Google Editorial Calendar, "Plastic Fencing", May 12, 2001, 2 pages.
Matuana et al., Polymer Engineering and Science, "Processing and cell morphology relationships for Microcellular foamed PVC/wood fiber composites", vol. 37, No. 7, Jul. 1997, pp. 1137-1147.
Matuana et al., Cellular and Microcellular Materials, Effect of cell morphology on the properties of microcellular foamed PVC/wood fiber composites, vol. 76, 1993, 16 pages.
Saint-Gobain Vetrotex, Twintex, Products Available, Trade literature, May 21, 2004, pp. 1,2.

(Continued)

*Primary Examiner*—Edward J Cain
(74) *Attorney, Agent, or Firm*—Duane Morris LLP

(57) ABSTRACT

Polymer composite building materials are provided which contain resin, and about 20-75 wt. % fillers and additives, in which the fillers contain at least one bulk filler for reducing the amount of resin needed to make the building material, and at least one aesthetically functional filler for providing the building material with an aesthetic appearance. The bulk filler and the aesthetically functional filler of this embodiment are non-toxic, resistant to microbial attack, and have a Mohs hardness of less than about 5.

37 Claims, 3 Drawing Sheets

OTHER PUBLICATIONS

Saint-Gobain Vetrotex, Twintex, News, Trade literature, , May 21, 2004, pp. 1-3.
Kroy Trade literature, Section 02820, Fences and Gates, Sep. 2002, pp. 1-8.
Kroy Trade literature, Beyond Black™ Ornamental Fence, Jul. 8, 2003, pp. 1-2.
International Search Report dated Jan. 22, 2003.
International Search Report dated Feb. 19, 2004.
Engineered Materials Handbook, vol. 1, Composites, 1987, pp. ii, 158.
"Trex coextrudes white PVC railing", Trade literature, Jan. 21, 2005, 2 pages, http://finance.messages.yahoo.com/bbs?.mm=FN&action=m&board=18343131&tid=twp.
Wood Extrusion, Wood is Good for Compounding, Sheet & Profile, Trade Literature, Feb. 22, 2005, 6 pages http://www.feedscrews.com/shownews/381.
Ebuild, The Professional's Guide to Building Products™, Trade literature, Aug. 19, 2004, 4 pages http://www.ebuild.com/guide/resources/product-news-print.asp?id=68609.
Woodchuk Composite Railing System, Performs Better Than Wood Could, Trade literature, 2005, 4 pages http://woodchuk.com.

Office Action dated May 23, 2005, in U.S. Appl. No. 10/939,600.
Office Action dated Aug. 3, 2005 in U.S. Appl. No. 10/441,530.
Office Action dated Sep. 20, 2005 in U.S. Appl. No. 10/281,795.
Office Action dated Feb. 10, 2004 in U.S. Appl. No. 10/281,795.
Office Action dated Jul. 12, 2004 in U.S. Appl. No. 10/281,795.
Office Action dated May 23, 2005 in U.S. Appl. No. 10/939,600.
Office Action dated Dec. 14, 2005 in U.S. Appl. No. 10/939,600.
Office Action dated Nov. 17, 2004 in U.S. Appl. No. 10/281,796.
Office Action dated Jan. 29, 2003 in U.S. Appl. No. 09/988,985.
Office Action dated Sep. 22, 2003 in U.S. Appl. No. 09/988,985.
Office Action dated Jan. 27, 2004 in U.S. Appl. No. 09/988,985.
Office Action dated Oct. 18, 2004 in U.S. Appl. No. 09/988,985.
Office Action dated Mar. 21, 2005 in U.S. Appl. No. 09/988,985.
Office Action dated Jan. 30, 2006 in U.S. Appl. No. 10/441,530.
Office Action dated Jan. 30, 2006, in U.S. Appl. No. 10/441,530.
Saint-Gobain Vetrotex, Twintex Overview, trade literature, pp. 1-2, 2001.
Office Action dated May 19, 2006, in U.S. Appl. No. 10/939,600.
Office Action dated Apr. 5, 2006 in U.S. Appl. No. 10/281,795.
Office Action dated Aug. 29, 2006 in U.S. Appl. No. 10/441,530.

* cited by examiner

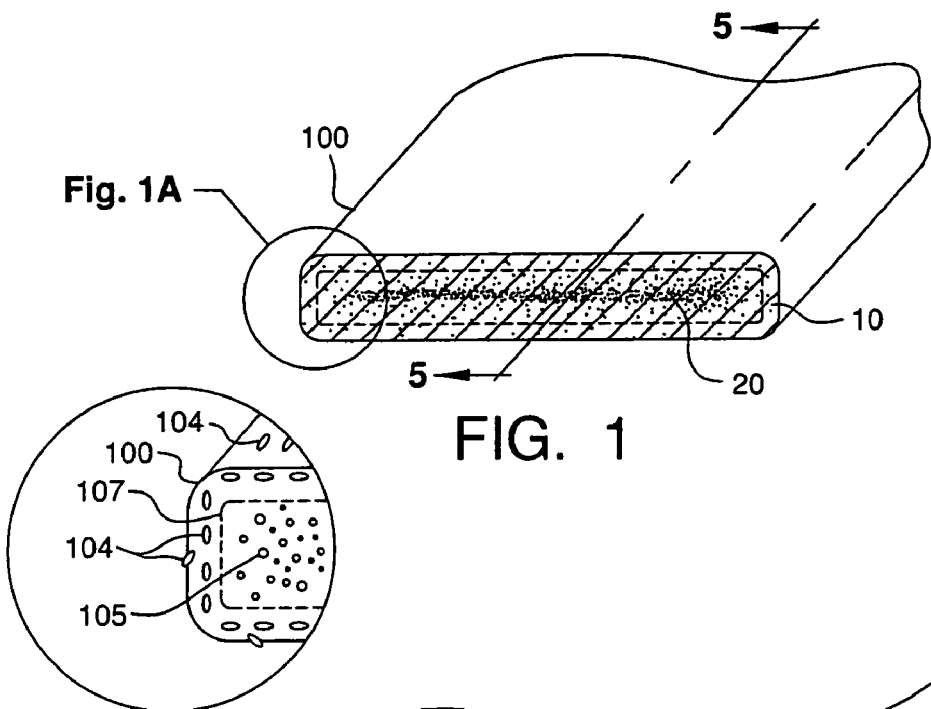
FIG. 1
FIG. 1A
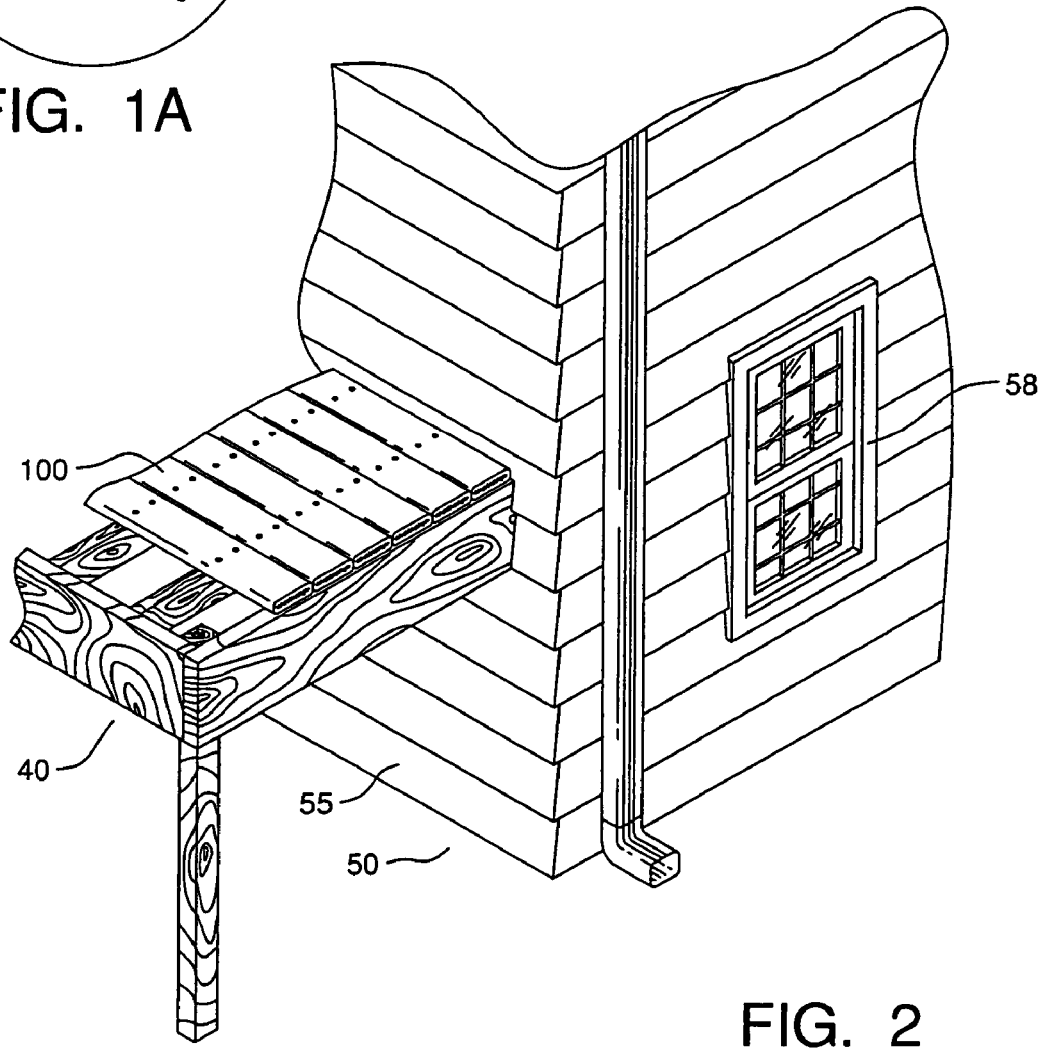
FIG. 2

POLYMER-FIBER COMPOSITE BUILDING MATERIAL WITH BULK AND AESTHETICALLY FUNCTIONAL FILLERS

CROSS-REFERENCE TO RELATED APPLICATIONS

The present application is related to U.S. application Ser. No. 09/055,098, filed Apr. 3, 1998, now U.S. Pat. No. 6,344,268, issued Feb. 5, 2002, and Ser. No. 10/607,743, filed Jun. 27, 2003, which are hereby incorporated by reference.

FIELD OF THE INVENTION

This invention relates to polymer-fiber composites used in building construction, such as, for example, in the fabrication of decking, railing, siding and structural materials, and more particularly, to composites which simulate real wood or have other interesting aesthetic qualities.

BACKGROUND OF THE INVENTION

Wood plastic composites ("WPC") refer to any composite that contains wood such as wood flour or wood fiber and plastic such as polyethylene, polypropylene, polyvinyl or polyvinyl chloride. The WPC or "synthetic lumber" industry has grown dramatically in the past ten years in North America. The main applications include decking, railing, boardwalk, porch, park bench seats and wood trim which have accounted for more than about five million U.S. dollars in sales in 2003. The use of wood plastic composites in place of traditional wood materials is driven by the characteristics of better resistance to moisture and rot, better resistance to insects, less routine maintenance, no cracking, splitting, warping or splintering.

Synthetic lumber has been used as a substitute for wood in areas where wood can deteriorate quickly due to environmental conditions. Although in the past, the commercialization of synthetic lumber was limited by costs, modern recycling techniques and low cost extrusion manufacturing capability have permitted greater penetration by polymer-fiber composite materials into the commercial and residential markets. One such product manufactured under the trademark TREX, by Trex Company, LLC, Winchester, Va., consists of a polyethylene-wood fiber blend which is extruded into board dimensions for decking applications. Polyethylene-wood composite boards in 5/4 inch thicknesses have sufficient rigidity to be used as decking planks, but typically are not recommended for structural wood substitutes, such as the lattice supporting structure often used under decks.

Polyethylene composites are attractive because they permit screw fasteners to "countersink", such that the heads of the screws bury or at least become flush with the board surface, without predrilling. Synthetic wood products, like TREX decking, are weather resistant and relatively maintenance free. Once installed, they resist splintering and warping normally associated with wood boards. They are also characterized by "color weatherability"; for example, the TREX product initially is a light coffee brown color and converts to a weathered gray appearance when exposed to rain water and sunlight. Accordingly, the TREX decking color fades and is not permanent.

In addition to polyethylene, other plastics have been suggested for use in the manufacture of synthetic wood products. Polyvinyl-chloride ("PVC") thermoplastics have been used in combination with wood fibers to make extruded materials, for use in decking, windows and doors. See U.S. Pat. No. 5,486,553 assigned to Andersen Corporation, and Stucky et al., U.S. Pat. No. 6,344,268, assigned to CertainTeed Corp., and incorporated herein by reference.

Color is a key component in the appearance of wood plastic composites. Most successful companies have a product line which includes four colors, namely, red, dark brown, tan and gray, to duplicate the main premium woods, for example, mahogany, red cedar, oak, etc. Companies with only one or two colors enjoy only limited market share. The ideal color mix is estimated to be 70 percent dark color such as dark brown or red and 30 percent light or translucent color such as gray or tan. The use of industrial pigments to obtain dark colors represents a significant component of the raw material cost. Industrial pigments made of iron oxide usually cost about $1.50 per pound while other pigments can be as expensive as $4.00 per pound, which is a multiple of the cost of the resin.

Wood plastic composites with a low wood flour content tend to have a very plastic appearance, while wood plastic composites with a high wood flour content usually have a better touch and appearance due to the wood particles, which appear at the surface of these products.

The main advantages of organic wood flour is its availability, light weight and low cost. Wood flour is also less abrasive to processing equipment than most conventional fillers. For many years the plastic industry was reluctant to use wood or other natural cellulosic fillers, due to their low bulk density, low thermal stability and tendency to absorb moisture. While this perspective has changed somewhat in the last ten years, due to the success of several wood plastic composite products, wood flour and wood fiber are still sensitive to moisture absorption, fungi attack and decay. High wood loadings of generally between 30 and 70 wt. % result in a surface which is covered by many unprotected wood particles, which are not encapsulated by plastic, and thus are subject to attack by decay, fungi and moisture.

Complete encapsulation of wood flour by plastic to prevent moisture absorption and fungal attack is not practical for cost reasons, generally, it would require a high percentage of plastic to fully encapsulate the wood particles, and aesthetic reasons, the resulting finish would look too much like a plastic. Wood polymer composites with too much plastic feel more like plastic than wood and are not appreciated by customers.

Successful companies have developed wood polymer composites with high wood loading of generally between 50 and 60 wt. %. To account for wood sensitivity to moisture absorption and bacterial growth, manufacturers of high wood loading building components rely on the use of extensive amounts of anti-bacterial agents to limit the growth of fungi and algae at the surface of these products. The use of these anti-bacterial agents does not guarantee that the products will be maintenance free and does not prevent infiltration of water into the product, nor prevent physical and photo-chemical degradation. Product appearance is likely to change within a few months or years, and colors may be affected first.

The use of mineral fillers in plastic composite lumbers is not new, Century Board, Inc., a licensee of Ecomat, Inc. has developed a plastic composite lumber that contains 70 wt. % fly ash. The resin is a modified polyester-polyurethane thermoset that can be foamed to produce products with similar density, stiffness and toughness of wood products. See U.S. Pat. Nos. 5,604,266; 5,508,315; and 5,369,147, which are hereby incorporated by reference. The Ecomat building materials describe the use of fly ash and several other mineral fillers with a polyester-polyurethane resin to produce foamed plastic composites for building applications. However, fly ash derived from waste incinerators, which is some of the most inexpensive fly ash available, is not generally safe and has a high content of heavy metals.

Accordingly, there remains a need for a building material which more closely simulates wood products, or which has heretofore previously unavailable aesthetic properties.

SUMMARY OF THE INVENTION

In a first embodiment of this invention, a polymer composite building material is provided which contains about 25-80 wt. % resin, and about 20-75 wt. % fillers and additives. The fillers preferably include a bulk filler for reducing the amount of resin needed to make the building material and an aesthetically functional filler for providing the building material with an aesthetic appearance. The bulk filler and the aesthetically functional filler are non-toxic, resistant to microbial attack, and have a Mohs hardness of less than about 5.

The present invention replaces industrial pigments and dyes through the use of low cost non-toxic fillers, and provides plastic composite building materials with permanent colors relatively inexpensively. In addition, the present invention can provide a grain, surface texture, touch or gloss component to the appearance of plastic composite lumbers.

The present invention also contemplates the replacement or partial replacement of untreated wood flour or fiber by inorganic fillers to develop a more stable plastic composite building material which is less sensitive to moisture absorption, fungal attack, and change in appearance and color.

The present invention preferably employs different fillers which can be blended together to optimize the mechanical properties, color and texture. These fillers can be optimized for ease of loading and machine through put. For example, clays can be used to significantly improve impact strength and mechanical properties due to their high aspect ratio and limited particle size, for example Dixie® clay from R.T. Vanderbilt, Inc. has an average particle size of less than about 0.5 microns, and is a desirable additive for this invention. The amount of clay used in the resin has an upper limit though, due to its impact on melt viscosity. On the other hand, fly ash, such as class F or C fly ash, derived from a coal fired power plant, can be added in a significant percentage to the resin without dramatic increases in viscosity due to its spherical shape and wide sized distribution. Class F or C fly ash can act as a ball bearing to improve machine through put and is desirable.

In further embodiments of this invention, low cost color fillers can be added to the plastic composite building materials to provide lasting colors similar to premium woods, such as mahogany, red cedar, oak or cherry. Such aesthetic fillers can also achieve another purpose, such as providing a unique grain and/or surface texture that is aesthetically attractive. Alternatively, algaecides, fungicides and other anti-bacterial agents could be employed to reduce mold growth. Fire retardants, such as borax and gypsum, etc. can also be added.

In still further embodiments of the present invention a foaming agent can be provided, such as gas, $CO_2$, $H_2O$ vapor, or chemical foaming agents to foam the product to achieve a total porosity of preferably less than 40%, and more preferably less than 25% by volume, which maintains good mechanical properties, but reduces weight. A total porosity, if controlled within the desired range, also reduces the chance of water absorption into the plastic composite, and any resulting biological attack. The mineral fillers used in the composite of this invention can be hydrated, such as hydrous kaolin clay, such that a vapor is released during the compounding and molding process that can be used to form porosity within the composite. Water chemically bound to a mineral filler of this invention can be released when the composite is subject to excessive heat and can also act as a fire retardant.

This invention also provides a building product that can include a single layer or multiple layers of weatherable materials and properties. For example, this invention contemplates an economical middle layer, or an unexposed bottom layer, with either a capstock external or upper layer that provides the product with excellent color retention, algae, fungus and mildew resistance and, optionally, fire retardant properties.

This invention also provides a process for making a polymer composite building material which includes the steps of providing a resin and a plurality of fillers and additives, said fillers comprising at least one aesthetically functional filler for providing the building material with a desired aesthetic appearance and a bulk filler for reducing the amount of resin needed to make the building material. The method further includes the step of mixing the resin fillers and additives and finally, melt processing the resin fillers and additives into a shaped article useful in making a building material. Several processes such as casting, molding, extrusion, co-extrusion, injection molding, co-injection molding, etc. can be used to produce the plastic composite products according to this invention, if co-extrusion or co-injection processes are used, the surface of the composite—generally a skin layer of about $1/16$-$1/4$ inches in thickness—can have a different composition than the center of the composite, or the core. The plastic composite building material of this invention can be embossed, engraved or cast in a textured mold to duplicate a wood grain.

BRIEF DESCRIPTION OF THE DRAWINGS

The present invention may be better understood in view of the following FIGURES:

FIG. 1: is a partial, cross-sectional, front perspective view of a preferred foamed polymer-fiber composite building material of this invention;

FIG. 1A: is an enlarged partial, cross-sectional front perspective view of the composite building material of FIG. 1;

FIG. 2: is a front perspective, partial view, of a deck construction and home using the preferred composite building materials of this invention;

DETAILED DESCRIPTION OF THE INVENTION

The polymer-fiber composites of this invention can be used by themselves, or in conjunction with a "capstock" or coextrusion of other materials, such as, for example, pure or copolymer resins, resins filled with wood or glass fiber, or additives, such as sand, to provide better traction, strength, ultraviolet protection or textures to provide a more wood-like appearance. This invention also pertains to a process for making polymer-fiber composites, such as building materials, including roof shingles, siding, floor tiles, paneling, moldings, structural components, steps, door and window sills and sashes; house and garden items, such as planters, flower pots, landscape tiles, decking, railing, outdoor furniture, fencing, and playground equipment; farm and ranch items, including pasture fencing, posts and barn components; and marine items, for example, decking, bulkheads and pilings.

As shown in the figures, and in particular, FIG. 1, there is shown a preferred polymer-fiber composite building material 100 which includes about 30-80 wt. % of a polymeric resin, and about 20-70 wt. % fillers, with bulk filler 105 for reducing the amount of resin needed to make the building material, and an aesthetically functional filler 104 for providing the building material with an aesthetic appearance. This composite building material 100 preferably includes a plurality of pores or cells defining porosity 20 therein resulting from the addition of a blowing agent or gas to a molten precursor of said composite building material 100. The porosity 20 preferably measures at least about 1%, and more preferably about 5-40% by volume of solids in the composite building material 100. The composites of this invention also may include one or more further additives, such as a process aid, pigment, or plasticizer. As shown in FIG. 1A, the bulk filler 105 and aesthetically functional filler 104 can optionally be located in different locations, or in the same location.

In one preferred embodiment, the aesthetically functional filler is located at least proximate to the surface of the building material, such as for example, to be visible or affect the surface appearance of the building material. See FIGS. 5 and 5A. This can provide, or assist in providing, a surface texture, for example, if the functional filler pierces or undulates the surface, or a gloss, if the surface resin permits transparency or penetration by light, and this light is reflected or absorbed by the functional filler.

Figure 3:
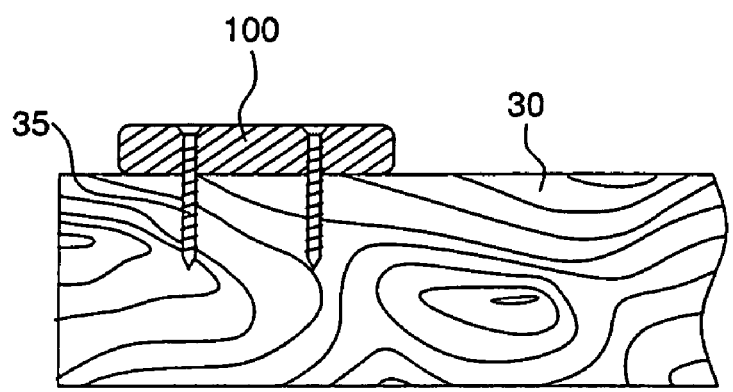
FIG. 3: is a side, cross-sectional view of the composite building material of FIG. 1 illustrating a screw which has been inserted in a counter-sink relationship with a top surface of the building material.
Figure 4:
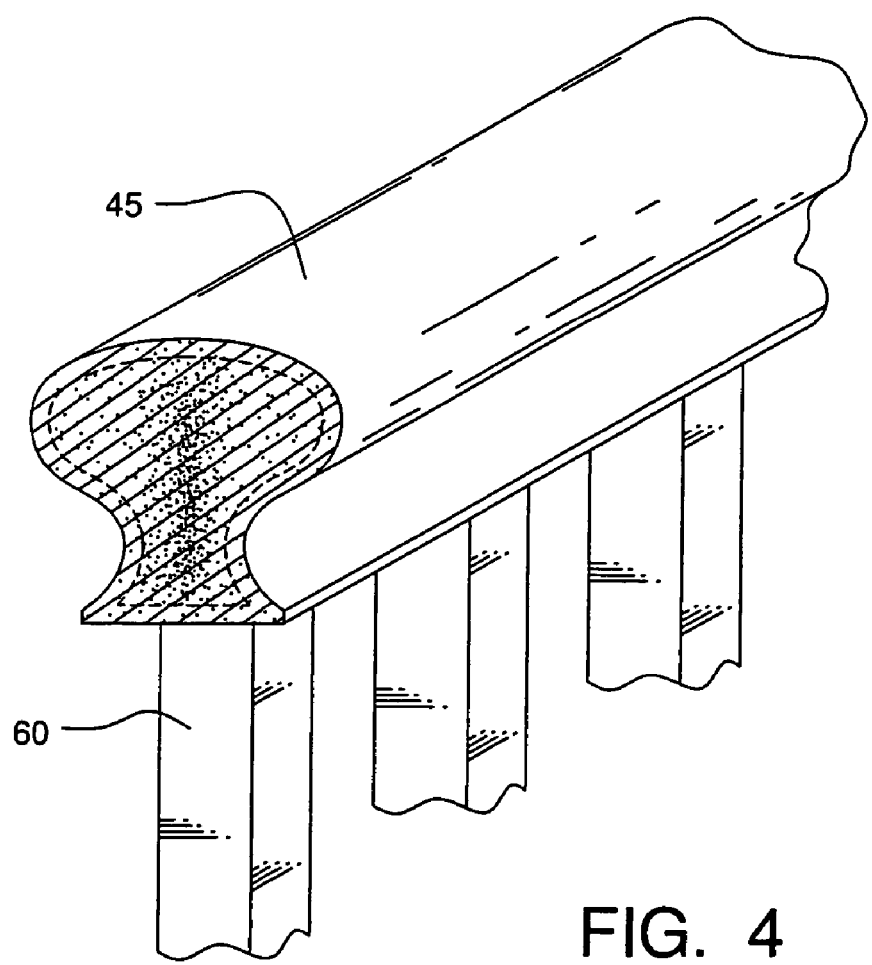
FIG. 4: is a partial, cross-sectional, front perspective view of a preferred railing of this invention.

As shown in FIGS. 2-4, the polymer-fiber composite building material 100 of this invention is ideally suited for decking, siding, railings, window frames, including stiles and rails, and balusters. Even though the composite building material 100 is lightweight, it generally has a flexural modulus, tensile modulus, and/or Young's modulus of about 100,000 to 450,000 psi. As shown in FIG. 3, the composite building material 100 preferably allows screw and nail fasteners, such as screw 35, to be secured in a countersink relationship with the surface of the composite building material 100, or below the surface, without predrilling. This is generally accomplished by the use of plasticizing agents to lower the compression strength of the composite building material 100, and/or by the careful use of blowing agents or gas in the molten precursor of the composite building material 100, so as to provide a cellular internal structure containing porosity 20 surrounded by a polymeric skin 10. This porosity, even without plasticizing agents, provides enough compressive strength relief to permit screw fasteners to countersink without predrilling. This permits a very attractive deck 40 of side-by-side composite boards. Ideally, for strength and cost considerations, the support structure and columns of the deck are typically made from wood.

Also as shown in FIG. 2, the preferred composite building material 100 can be fashioned, for example, by extrusion, compression molding, pultrusion, etc., in the shape of siding panel 55 or a window frame component 58, such as a stile or rail, for a house 50. As shown in FIG. 4, the composite building material 100 can also be shaped into a railing 45 or baluster 60.

The preferred materials of this invention will now be described in more detail. The composites generally contain about 25-80 wt. % resinous materials, such as thermoplastic and thermosetting resins, for example, thermoplastics such as PVC, polyethylene (PE, LDPE and HDPE), polypropylene (PP), nylon, polycarbonate, polysulfones, polyphenylene oxide, cellulosics and polyphenelene sulphide, and thermosets, such as polyesters, epoxies, polyurethanes, and silicones, etc. A preferred thermoplastic material for the panels of this invention is PVC.

The preferred thermoplastic and thermosetting polymers of this invention can be combined with additives such as anti-oxidants, UV-stabilizers, coupling agents, impact modifiers, thermal stabilizers, lubricants, plasticizers, biocides, processing aids, flame retardants or other commonly available additive materials, when needed. These resins can also be combined with other monomers in the manufacture of copolymers. Such copolymers can be linear copolymers, graft copolymers, random copolymers, regular repeating copolymers, block copolymers, etc. Monomers that can be combined to form copolymers include acrylonitrile; alpha-olefins such as ethylene, propylene, etc.; chlorinated monomers such as vinylidene dichloride; acrylate monomers such as acrylic acid, methyl acrylate, methyl-methacrylate, acrylamide, hydroxyethyl acrylate, and others; styrenic monomers such as styrene, alpha methyl styrene, vinyl toluene, etc.; vinyl acetate; or other commonly available ethylenically unsaturated monomer compositions. Such monomers can be used in an amount of up to about 50 mol-%. The preferred polymers can be compounded to be flexible or rigid, tough or strong, to have high or low density, or to have any of a wide spectrum of physical properties or processing characteristics. The preferred polymers can also be alloyed with other polymers, such as ABS, acrylic, polyurethane, and nitrile rubber to improve impact resistance, tear strength, resilience, or proccessability. They can be produced waterwhite in either rigid or flexible compositions, or they can be pigmented to almost any color.

In the preferred embodiments of this invention, the polymer resin can optionally contain a small amount of plasticizer, algaecide, fungicide and/or fire retardant which, in the preferred embodiment, are also fillers. This polymer material is tough and can be compounded to have a wide range of properties, including impact resistance and weatherability, e.g., fading color to a lighter color, darker color, in the same of different color family, such as for example, a wood gray appearance. It can possess a tensile strength of about 6,000-7,500 psi, a percent elongation of about 40-80%, and a tensile modulus of about $3.5$-$6.0 \times 10^6$ psi.

The composite building materials of this invention can be cast, co-extruded, co-injection molded, injection molded, vacuum-molded, extruded, pultruded or drawn, using customary manufacturing techniques for thermoplastic and thermosetting materials. For example, the compounded resin can be co-extruded or co-injection molded to provide a skin layer, transition area or line 107, and core area, which is preferably foamed through a die to produce boards and other shapes having a length of about 4-20 feet and thicknesses of about 0.05-6.0 inches. The extruded boards can be subject to further molding, calendaring, embossing, engraving and finishing to provide a wood grain or fanciful texture. Alternatively, the compounded resin can be cast in a textured mold to provide a textured pattern, such as a wood grain.

The composite building material 100 of this invention also can contain about 20-70 wt. % fillers and additives. The fillers can include bulk fillers and aesthetically functional fillers; such as color fillers and texture fillers. The preferred fillers are desirably no more expensive than the resins used in the matrices of this invention on a dry weight basis. They are also preferably non-abrasive to steel dies, molds and extrusion equipment used to make the building materials 100 of this invention. Accordingly, such fillers preferably have a Mohs hardness of less than about 7, and more preferably less than about 5.

The hardness of a mineral is one of the most diagnostic and easy tests to perform in the attempt to indentify an unknown mineral. Hardness is a measure of a mineral's resistance to abrasion and reflects the atomic structure of a mineral.

TABLE 1

MOHS HARDNESS SCALE
Hardness is measured on the Mohs Scale, identified numerically hardness of by standard minerals, from 1 (softest) to 10 (hardest):

1. Talc
2. Gypsum
3. Calcite
4. Fluorite
5. Apatite
6. Orthoclase
7. Quartz
8. Topaz
9. Corundum
10. Diamond A mineral or filler of a given hardness will scratch a mineral of a lower number. With this systematic approach, one can use minerals of known hardness to determine the relative hardness of any other mineral.

Of the fillers associated with this invention, bulk fillers and aesthetically functional fillers can be distinguished. Although a single filler could have both bulk and aesthetically functional filling features or characteristics, the bulk fillers of this invention are primarily for reducing the amount of resin needed to make the building material. They can also minimize the raw material costs, if they are less expensive than the resin of the matrix, and desirably optimize mechanical properties, such as tensile modulus, co-efficient of thermal expansion, stiffness and toughness. A combination of several organic or inorganic fillers such as fly ash, cenospheres, clays such as kaolin clay, talc, wood flour, kenaf, flax, etc., can be used as a bulk filler. Bulk fillers should be inexpensive, preferably less than the cost of the resin. Additional bulk fillers can include short glass fibers (1/16-1/2"), nano fillers, especially those with a high aspect ratio, which can be used with one or more other bulk fillers to improve mechanical properties.

The aesthetically functional fillers 104 of this invention can provide the plastic composite product or building material with permanent color, a fading color (e.g., in the same or different color family), gloss, aesthetic and surface texture. A combination of several fillers can be used as an aesthetically functional filler. Aesthetically functional fillers can also have additional functions, such as insect repellence, anti-bacterial properties (such as algaecides, fungicides, etc.), flame retardancy, or anti-slipping properties. Alternatively, additional fillers can be added with such properties.

The functional fillers 104 of this invention can be broken down into color fillers and texture fillers, among others. Color fillers provide the plastic composite building material with some form of tint of permanent color. While industrial mineral or organic pigments costing more than fifty cents per pound are available, this invention prefers to use color fillers which have a cost of less than fifty cents per pound. The average particle size of color fillers should be less than 100 microns, and preferably, less than 20 microns, so that they are generally not visible to the naked eye as individual particles. The color can be red, reddish, tan, brown, brownish, yellow, orange, dark brown, or black, to duplicate wood colors. However, other colors such as blue, green, purple, or white are also possible. A blend of different mineral fillers with different colors, for example red and gray, can be used to achieve specific color shades other then those described above. For example, the following minerals can be used as possible color fillers:

TABLE 2

COLOR FILLERS AND THEIR HUES

| MINERAL | HUE | HARDNESS |
| --- | --- | --- |
| Bauxitic clay | Brown/red | Low |
| Phlogopite-mica (sezorite) | Brown | 2.5-3 |
| Biotite | Black to brown | 2.5 |
| Vermiculite | Usually brown to golden brown | 1.5 |
| Pyrophyllite | White, yellow, can also be stained brown by iron oxides | 1.5 |
| Class F fly ash | Reddish, tan or gray | |
| Slate dust | Black, gray, red, green, or purple | |
| Limonite and Goethite | Yellow, orange, reddish brown, or brownish black | |

In the preferred embodiment, this invention also employs texture fillers that serve the function of providing the plastic composite building materials with aesthetic grain, gloss, surface texture, etc. The 2004 commercial cost of the texture fillers should also be less than about fifty cents per pound, and preferably less than twenty-five cents per pound. The average particle size of the texture fillers should be more than 100 microns, and preferably more than 200 microns so that they are visible as individual particles by the naked eye. Platy and or elongated particles are preferred. According to one aspect of the present invention, minerals that belong to the phyllosilicate group are preferred. Minerals that belong to the mica and clay sub-groups are even more desirable. For example, the following minerals can be used as possible texture fillers:

TABLE 3

TEXTURE FILLERS AND THEIR HUES

| MINERAL | HUE | HARDNESS |
| --- | --- | --- |
| Phlogopite-mica (sezorite) | Brown | 2.5-3 |
| Biotite | Black to brown | 2.5 |
| Vermiculite | Usually brown to golden brown | 1.5 |
| Muscovite | White, silver, yellow and brown | 2-2.5 |
| Pyrophyllite | White, yellow, can also be stained brown by iron oxides | 1.5 |
| Chlorite | Can be green, yellow, red, lavender, or black | 2-3 |
| Slate dust | Can be black, gray, red or purple | |

The texture fillers of this invention preferably have an elongated structure having an aspect ratio of at least 3:1, and are also preferably oriented in substantially the same direction in the plastic composite building material. The texture fillers can have a different color from the color fillers. For example, this invention anticipates using black slate dust as a texture filler and red-brown bauxitic clay as a color filler. Due to the contrast of the colors of the slate dust and clay, the black texture filler will duplicate the structure or grain of a premium hard wood. The texture fillers as described in FIG. 1 can be located near the surface of the plastic composite building material 100. If the texture fillers 104 have a platy structure and are preferentially oriented parallel to the surface, it will enhance the gloss of the product, especially in the case of highly reflective fillers such as mica or slate dust.

The texture fillers 104, located at or near or at the surface of the plastic composite building material, can be fully encapsulated, partially encapsulated, fully covered and/or partially covered by resin. This will modify the appearance as well as the touch of the product. Texture fillers having an elongated structure, preferentially oriented in the same direction, such as by an extrusion process to produce a plastic composite building material, in combination with using texture fillers having a different color than the color fillers, enhances the imitation of wood grains.

In addition to the above-described fillers, other functional fillers can be provided within the polymeric composite building materials of this invention. For example, cuprite or waste copper ore, can act as an anti-bacterial, and also as a color filler. Diatomite can act as an insect repellent, and hydrated minerals such as ATH can act as a fire retardant.

The texture fillers 104 can also be provided with an organic or inorganic coatings, such as a resin, to modify its color, durability, gloss, wettability by the resinous matrix, hydrophilic or hydrophobic properties, antimicrobial, biological (or antibiological) properties, mechanical properties, physical properties, or a combination of these.

While less desirable than the above-described inorganic fillers, cellulosic fillers can be used as part or all of the aesthetically functional filler or bulk filler requirements, especially if treated, either before, during, or after melt processing with the resin, to resist microbial attack, for example, by being coated with a resin or saturated with an anti-microbial composition. Preferably, the amount of untreated wood or cellulosic fibers is less than 50 wt. % of the fillers, more preferably, less than 30 wt. %, and most preferably, less than about 15 wt. %, or none at all.

Cellulosic fibers can be derived from recycled paper products, such as agrifibers, pulp, newsprint, soft woods, such as pine, or hard woods from deciduous trees. Hard woods are generally preferred for fiber manufacture because they absorb less moisture. Additional fiber make-up can be derived from a number of secondary sources including soft wood fibers, natural fibers including bamboo, rice, sugar cane, and recycled or reclaimed fiber from newspapers, cardboard boxes, computer printouts, etc. This invention can utilize wood flour of about 10-100 mesh, preferably 20-30 mesh. This invention may use the resin and wood flour components with a chemical blowing agent, or may introduce a gaseous medium into a molten mixture of the resin and wood fiber to produce a series of trapped bubbles prior to thermo-forming the mixture, for example, by molding, extrusion or co-extrusion. Such processes for making rigid foam articles are generally well known.

In one preferred process of this invention, a quantity of resin regrind (recycled resin) in small chunks is mixed with 20-30 mesh wood flour which has been predried to release any trapped moisture as steam. The mixture also includes a melt enhancer, such as a high molecular weight acrylic modifier, which improves melt elasticity and strength and enhances cellular structure, cell growth and distribution.

A chemical blowing agent or gas, such as steam or $CO_2$, can also be added to the mixture to reduce the density and weight of the composite building material 100 by foaming. If a chemical blowing agent is used, it is mixed into the compound during blending or at the feed throat of the extruder. In an extruder, the blowing agent is decomposed, disbursing gas, such as nitrogen, $H_2O$ vapor, or $CO_2$, into the melt. As the melt exits the extrusion die, the gas sites experience a pressure drop expanding into small cells or bubbles trapped by the surrounding polymer. The total porosity after blowing should be less than 40% and preferably less than 25% per volume to maintain good mechanical properties. The level of porosity near the surface of the product, as in the use of exposed water absorbing fillers like wood fiber, should be limited to reduce water absorption into the plastic composite building material, which can cause mold and blemishes.

Chemical blowing agents can be any of a variety of chemicals which release a gas upon thermal decomposition. Chemical blowing agents may also be referred to as foaming agents. The blowing agent, or agents, if more than one is used, can be selected from cydrous compounds, such as hydrous kaolin clay, chemicals containing decomposable groups such as azo, N-nitroso, carboxylate, carbonate, hetero-cyclic nitrogen-containing and sulfonyl hydrazide groups. Generally, they are solid materials that liberate gas when heated by means of a chemical reaction or upon decomposition. The vapor released during the resin compounding and molding process can be used to foam the composite. Water chemically bound to hydrous minerals can be released when the composite is subject to excessive heat and act as a fire retardant. Representative compounds include azodicarbonamide, bicarbonates, dinitrosopentamethylene tetramethylene tetramine, p,p'-oxy-bis (benzenesulfony]) hydrazide, benzene-1,3-disulfonyl hydrazide, aso-bis(isobutyronitrile), biuret and urea.

The blowing agent may be added to the polymer in several different ways which are known to those skilled in the art, for example, by adding the solid power, liquid or gaseous agents directly to the resin in the extruder while the resin is in the molten state to obtain uniform dispersion of the agent in the molten plastic. Preferably the blowing agent is added before the extrusion process and is in the form of a solid. The temperature and pressure to which the foamable compositions of the invention are subjected to provide a foamed composition will vary within a wide range, depending upon the amount and type of the foaming agent, resin, and cellulosic fiber or other filler that is used. Preferred foaming agents are selected from endothermic and exothermic varieties, such as dinitrosopentamethylene tetra mine, p-toluene sulfonyl semicarbazide, 5-phenyltetrazole, calcium oxalate, trihydrazino-s-triazine, 5-phenyl-3,6-dihydro-1,3,4-oxandiazin-2-one, 3,6-dihydro 5,6-diphenyl-1,3,4 oxadiazin-2-one, azodicarbonamide, sodium bicarbonate, and mixtures thereof.

In addition to the above, a coloring agent can be added to the compounded mixture, such as dyes, colored pigments, or flyash, or a mixture of these ingredients depending on the resulting color, and cost considerations. Such additives can provide "weatherability" or a faded grayish coloring or a permanent tint, such as blue, green or brown.

In addition to the above constituents of the preferred composite building materials of this invention, a coupling agent may be added to treat bulk and/or functional fillers. Coupling agents are desirable because they can affect the maximum amount of fiber that can be added to the resin ("filler capacity"), the mechanical properties, such as stiffness and tensile strength, and the durability of the resulting composite. Coupling agents may be added to fillers, or the fillers can be treated with coupling agents before final mixing. For example, the fillers can be pre-treated before they are compounded with the resin, or treated in-situ by adding a coupling agent to the resin during the compounding process to treat the fibers or fillers during compounding. Possible coupling agents could include silanes, carboxylic acids, phosphonic acids, other organic acids, titanates, zirconates, alumnino-zirconates, maleated polypropylene, maleated polyethylene, or combinations thereof.

Figure 5:
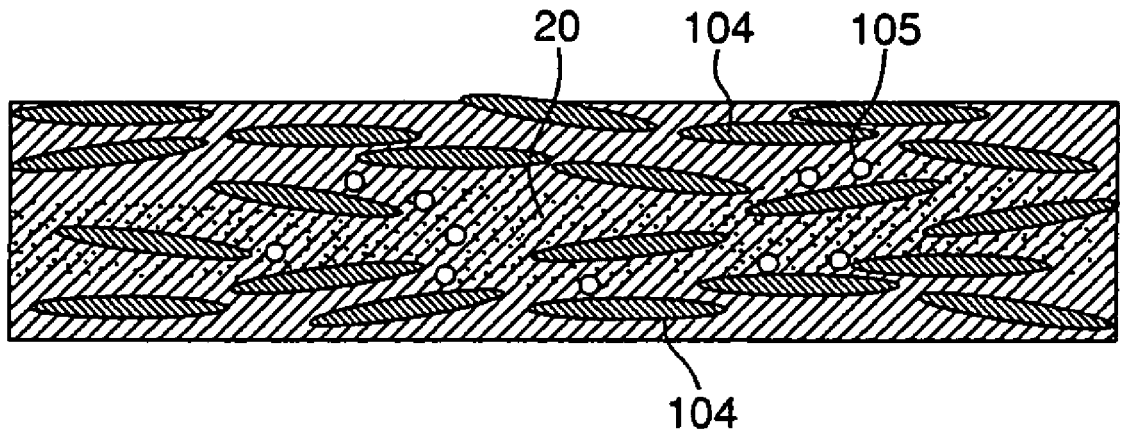
FIGS. 5 and 5A: are alternative cross-sectional views taken through line 5-5 of FIG. 1, showing the composite building material.
Figure 5A:
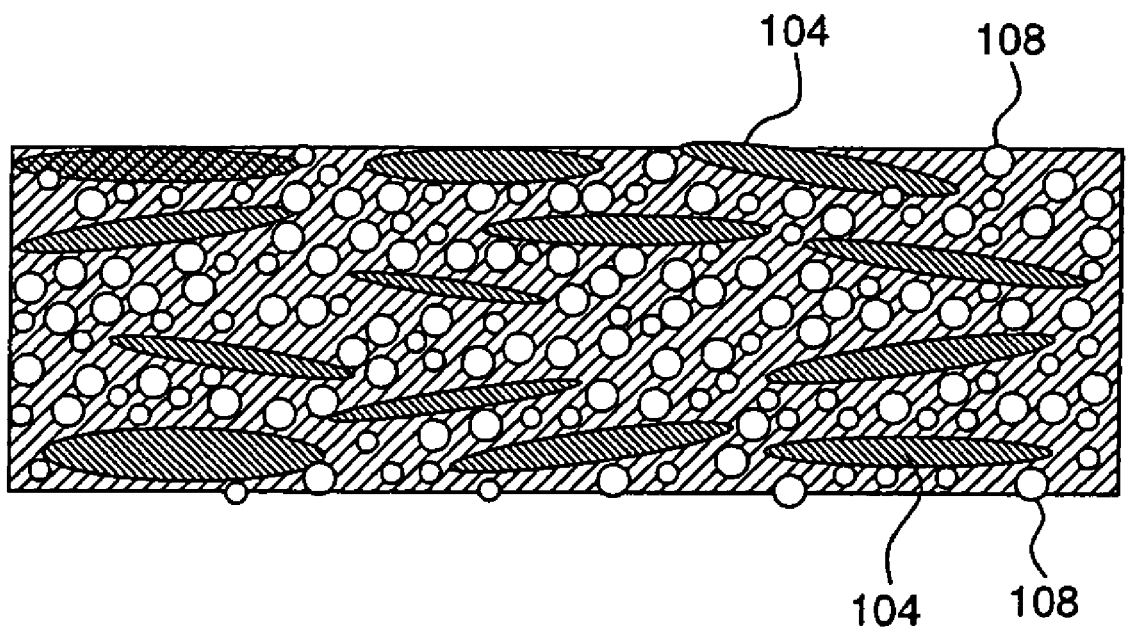

This invention can be further understood by reference to FIGS. 5 and 5A. FIG. 5 is a schematic cross-section of the composite building material with platy texture fillers 104 which augment the gloss. The cross-sectional view of FIG. 5A shows platy texture fillers 104 in combination with spherical fly ash 108, the latter acting as ball bearings between the texture fillers 104 during extrusion, for example.

From the foregoing, it can be realized that this invention provides improved polymer composite materials which include a resinous matrix, a bulk filler and an aesthetically functional filler. The fillers of this invention provide for mechanical, color, and texture properties which can simulate the appearance of real wood. Although various embodiments have been illustrated, this is for the purpose of describing, but not limiting the invention. Various modifications will become apparent to one skilled in the art, and are within the scope of this invention described in the attached claims.

We claim:

1. A polymer composite building material comprising:
   (a) about 25-80 wt. % resin; and
   (b) about 20-75 wt. % fillers and additives, said fillers including:
      (i) a bulk filler for reducing the amount of resin needed to make said building material, and
      (ii) an aesthetically functional filler for providing said building material with an aesthetic appearance, said functional filler comprising at least one color filler and at least one texture filler; a substantial portion of said texture filler being preferentially oriented parallel and proximate to the surface of said building material;
   said bulk filler and said aesthetically functional filler being non-toxic, resistant to microbial attack, and having a Mohs hardness of less than about 5.

2. The building material of claim 1 wherein said aesthetically functional filler comprises a color filler, a texture filler, or a combination thereof.

3. The building material of claim 1 wherein said bulk filler comprises cenospheres, clay, talc, short glass fibers, nano-fillers, or a combination thereof.

4. The building material of claim 1 wherein said aesthetically functional filler comprises the group consisting of: bauxitic clay, muscovite, chlorite, phlogopite-mica, biotite, vermiculite, pyrophyllite, slate dust, Class F or C fly ash, limonite, goethite, cuprite, iron ore, copper ore, aluminum ore, or a combination thereof.

5. The building material of claim 1 wherein said aesthetically functional filler comprises one of the group consisting of: a texture filler including phlogopite-mica, biotite, vermiculite, muscovite, pyrophyllite, chlorite, slate dust, or a combination thereof.

6. The building material of claim 1 wherein said aesthetically functional filler comprises a color filler having an average particle size of less than about 100 microns.

7. The building material of claim 1 wherein said aesthetically functional filler comprises a texture filler having an average particle size of more than about 100 microns.

8. The building material of claim 1 wherein said bulk filler has an aspect ratio of at least about 3:1.

9. The building material of claim 1 further comprising a filler comprising insect repellency, anti-microbial capability, fire retardancy, or a combination thereof.

10. The building material of claim 1 wherein said fillers comprise at least one filler having a different color from said resin.

11. The building material of claim 1 wherein said aesthetically functional filler comprises a texture filler having an aspect ratio of at least 3:1 and being substantially oriented in at least a first direction.

12. The building material of claim 1 wherein said aesthetically function filler comprises a texture filler which is darker in color than the color of said resin.

13. The building material of claim 1 wherein said aesthetically functional filler comprises a texture filler having a platy structure with an aspect ratio of at least 3:1 and oriented substantially parallel to the surface of said building material.

14. The building material of claim 1 wherein said aesthetically functional filler comprises a texture filler, wherein said building material has a higher gloss with said texture filler than without said texture filler.

15. A polymer composite building material comprising:
   (a) a resinous matrix;
   (b) about 20-75 wt. % fillers and additives, said fillers including:
      (i) a bulk filler for reducing the amount of a resin needed and for optimizing at least one mechanical property of said building material;
      (ii) a color filler which is not visible to the naked eye as individual particles; and
      (iii) a texture filler which is visible to the naked eye as an individual particles;
   said bulk, color and texture fillers being non-toxic, resistant to microbial attack and having a Mohs hardness of less than 5; said polymer composite comprising an outer skin portion and an inner core portion, said outer skin portion and said inner core portion containing different filler compositions.

16. The building material of claim 15 wherein a portion of said texture filler is located proximate to the surface of said building material but is not completely covered, coated or encapsulated by said resin.

17. The building material of claim 15 wherein a portion of said texture filler is coated with an inorganic or organic coating to modify its color, durability, gloss, wettability by said resin, hydrophobic properties, biological properties, antimicrobial activity, mechanical properties, physical properties, or a combination thereof.

18. The building material of claim 15 wherein said polymer composite contains a foamed portion.

19. The method of making a polymer composite building material comprising:
   (a) providing a resin and a plurality of fillers and additives; said fillers comprising at least one aesthetically functional filler selected from the group consisting of: bauxitic clay, muscovite, chlorite, phlogopite-mica, biotite, vermiculite, pyrophyllite, slate dust, Class F or C fly ash, limonite, goethite, cuprite, iron ore, copper ore, aluminum ore, and a combination thereof for providing said building material with a desired aesthetic effect, and at least one bulk filler selected from the group consisting of: cenospheres, clay, talc. nano-fillers, or a combination thereof, for reducing the amount of resin needed to make said building material;
   (b) mixing said resin, fillers and additives; and
   (c) melt processing said resin, fillers and additives into a shaped article useful in making said building material, said melt processing step (c) comprising co-extrusion, co-injection molding, or a combination thereof.

20. The method of claim 19 wherein said melt processing step (c) comprises casting, compression molding, injection molding, extrusion or a combination thereof.

21. The method of claim 19 wherein said co-extrusion or co-injection molding step comprises providing an outer skin and an inner core portion for said polymer composite of said building material.

22. The method of claim 19 wherein said aesthetically functional filler and said bulk filler are not evenly distributed throughout said building material.

23. A method of making a polymer composite building material comprising:

(a) preparing a first batch of pellets containing a first resin portion and at least one aesthetically functional filler;
(b) preparing a second batch of pellets comprising a second resin portion, optional additives and at least one bulk filler;
(c) blending said first and second batch of pellets together; and
(d) melt processing said blended first and second batch of pellets to produce a polymer composite building material.

24. The method of claim 23 wherein said functional filler comprises a color filler, a texture filler, or a combination thereof.

25. The method of claim 23 wherein said bulk filler is less expensive than said resin and contributes to optimizing at least one mechanical property of said building material.

26. The method of claim 23 wherein said first and second resin portions comprise a common polymer.

27. The method of claim 23 wherein said mixing step (b) comprises mixing said first and second batch of pellets in proximity to an extrusion screw of an extruder.

28. The method of claim 23 wherein said first and second resin portions each comprise a different polymer.

29. The method of claim 28 wherein said first and second resin portions are chemically compatible.

30. The method of claim 28 wherein said first and second resin portions are chemically non-compatible.

31. A polymer composite building material comprising a resinous matrix, a bulk filler and a functional filler; said functional filler comprising at least one color filler and at least one texture filler; said texture filler being substantially preferentially oriented parallel and proximate to the surface of said building material.

32. The building material of claim 31, wherein said texture filler and said color filler have a different color.

33. The building material of claim 31, wherein said texture filler has an elongated structure.

34. The building material of claim 31, wherein said texture filler contributes to the gloss of said building material.

35. The building material of claim 31, wherein said texture filler is at least partially exposed at the surface of said building material.

36. The building material of claim 31, wherein said bulk filler and functional filler are inorganic.

37. The building material of claim 31, wherein said texture filler has an aspect ratio of at least 3:1 and a platy appearance.

* * * * *